United States Patent [19]

Hollwarth

[11] 4,143,487
[45] Mar. 13, 1979

[54] PLANT GROWING RECEPTACLE

[76] Inventor: Armin Hollwarth, Goethestrasse 11, Langen, Fed. Rep. of Germany, 6070

[21] Appl. No.: 851,251

[22] Filed: Nov. 14, 1977

[30] Foreign Application Priority Data

| Nov. 15, 1976 | [DE] | Fed. Rep. of Germany | 7635954[U] |
| Nov. 15, 1976 | [DE] | Fed. Rep. of Germany | 7635993[U] |
| Dec. 24, 1976 | [DE] | Fed. Rep. of Germany | 7640650[U] |
| Dec. 24, 1976 | [DE] | Fed. Rep. of Germany | 2658880 |

[51] Int. Cl.² ............................................. A01G 27/00
[52] U.S. Cl. ............................................ 47/59; 47/39; 47/66; 47/81
[58] Field of Search ................................... 47/59–64, 47/66, 79–81, 39

[56] References Cited

U.S. PATENT DOCUMENTS

| 3,483,656 | 12/1969 | Baumann | 47/59 |
| 3,805,445 | 4/1974 | Baumann | 47/62 |
| 3,866,351 | 2/1975 | Cobia | 47/81 |
| 3,988,857 | 11/1976 | Baumann | 47/59 |
| 4,037,363 | 7/1977 | Baumann | 47/59 |

FOREIGN PATENT DOCUMENTS

| 2303069 | 7/1974 | Fed. Rep. of Germany | 47/59 |
| 2316275 | 10/1974 | Fed. Rep. of Germany | 47/59 |
| 2345899 | 3/1975 | Fed. Rep. of Germany | 47/63 |
| 397318 | 2/1966 | Switzerland | 47/63 |

*Primary Examiner*—Robert E. Bagwill
*Attorney, Agent, or Firm*—Larson, Taylor and Hinds

[57] ABSTRACT

A receptacle for growing plants includes a pot and a bowl-shaped inset piece or liner disposed in the pot. The floor of the pot has a plurality of upstanding tubular projections each having a passage open to the underside of the pot ands closed at its upper end. This arrangement allows simple and secure attachment of casters, feet, or other supports to the underside of the pot without destroying the aesthetic appearance of the pot itself. Various other projections and tubular members serving various technical purposes can also be provided in a similar manner without destroying the aesthetic appearance of the receptacle. The inset piece is adapted to conform to and cooperate with the projections and technical devices provided for a particular receptacle.

22 Claims, 14 Drawing Figures

_Fig. 11_

_Fig. 12_

PLANT GROWING RECEPTACLE

BACKGROUND OF THE INVENTION

The invention relates to a receptacle for growing plants, with at least one inset piece or liner adapted thereto, and with internal projections on the floor.

Receptacles for hydroponics are known (German OS 2,316,275) that have internal projections on the floor, so that an inner inset piece may be set thereon, and so that a free space will be produced between the projections, to accept the nutrient liquid for the plants. These solid projections cannot be used for application of supporting casters, feet, supporting brackets or the like on the receptacle, however.

Receptacles are known (German utility model 7,211,117) with inner projections on the floor that serve as a socket for a water level indicator. However, such sockets are closed in an annular configuration, and their floor does not lie on the plane of the floor of the receptacle, so that they tend to become dirty. Also, in this case, the water level indicator has to be a complete unit with a base plate having an exact seat on the socket floor and the water indicating function is often disturbed by stones or dirt.

In another known arrangement (German OS 2,316,275) the water level indicator can be disposed in a tubular projection on the outside of the side wall of the pot, said tubular projection being connected with the inner cavity of the pot, on the pot floor. However, this arrangement destroys the aesthetic appearance of the exterior of the pot.

It is an object of the invention to provide a receptacle for plant growing which, in connection with a bowl-shaped inner inset piece or liner, is suited to many purposes, both for earth culture and hydroponics, and for a multiplicity of different kinds of set-ups or arrangements, whereby the many technical devices on the pot will not interfere with its pleasing external appearance.

BRIEF SUMMARY OF THE INVENTION

The above problem is essentially solved in that some projections on the pot floor are made with a blind bore that is open to the underside of the floor. This arrangement allows simple and secure application of casters, feet or supporting brackets on the underside of the pot. In addition, holders or supports, e.g. for plant branches or for technical devices can be applied to these inwardly closed projections in the pot.

DETAILED DESCRIPTION

In a preferred embodiment of the invention, at least one other tubular projection is provided which extends from the floor of the pot up to the vicinity of its upper edge, and is open both at the upper end and on the underside of the pot floor. Through this shaft electric cables, for example, may be introduced, for a lamp or other electrical device disposed on the receptacle.

In a further preferred embodiment of the invention, other projections on the floor of the pot have the configuration of sockets onto which tubes may be slipped from above. These tubes may be, for example, watering tubes, water suction tubes, or tubular water level indicators. In accordance with the invention, the sockets may have holes or slits adjacent the pot floor so that through holes or slits immediately on the floor, water can penetrate into the space defined by the socket and a tube slipped onto it.

In hydroponics, it is not absolutely necessary to work with an inner inset piece in the pot. The nutrient liquid and the usual granular material (bloated clay) that gives the plants their necessary hold are put directly into the pot. However, for the sake of simpler removal of the plants from the pot, it has turned out to be advantageous nonetheless to work, at least in the case of smaller receptacles, even in hydroponics, with an inset piece in the pot. The inset piece is necessary in earth cultivation with water storage, also called water damming. In this case, there is a specific water reservoir in the pot, outside the inner inset piece which is watertight in its lower zone: there is suction from the reservoir via a wick or felt strip, advantageously of synthetic material, into the earth contained in the inset piece. Adequate root aeration can also be provided, by means of holes in the inset piece.

The invention is discussed in detail below, with reference to the drawings of which.

Figure 1:
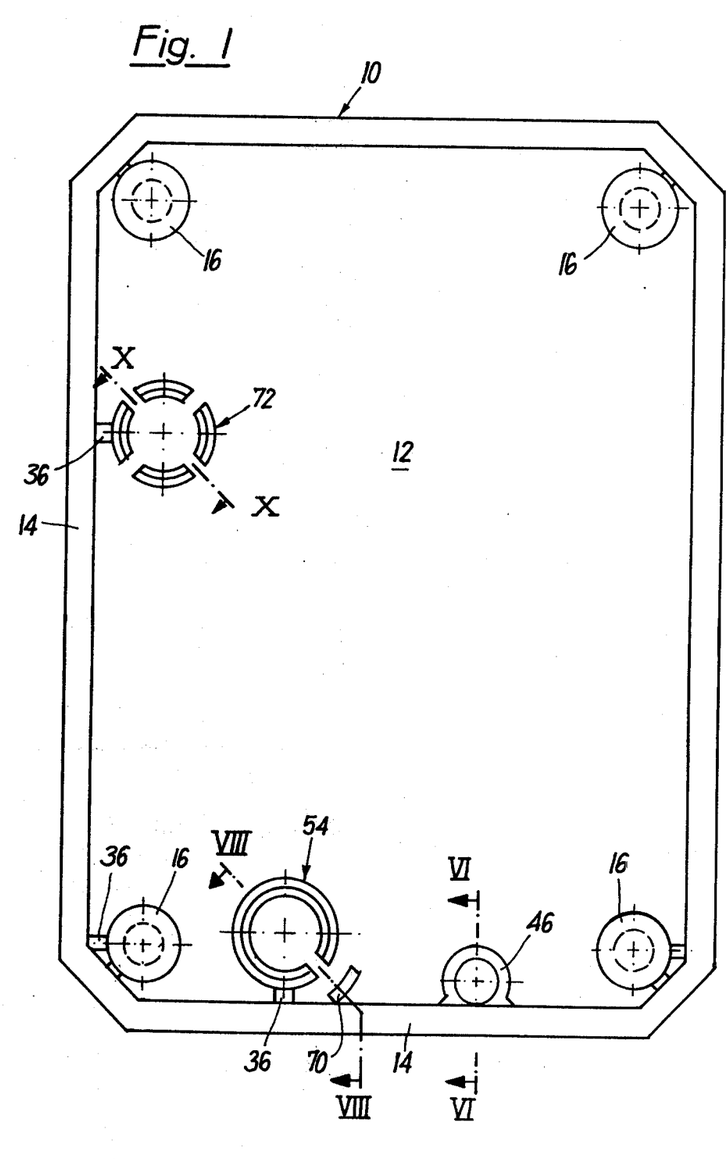
FIG. 1 shows a top view, from above, of a plant growing receptacle according to the invention, without an inner inset piece.
Figure 2:
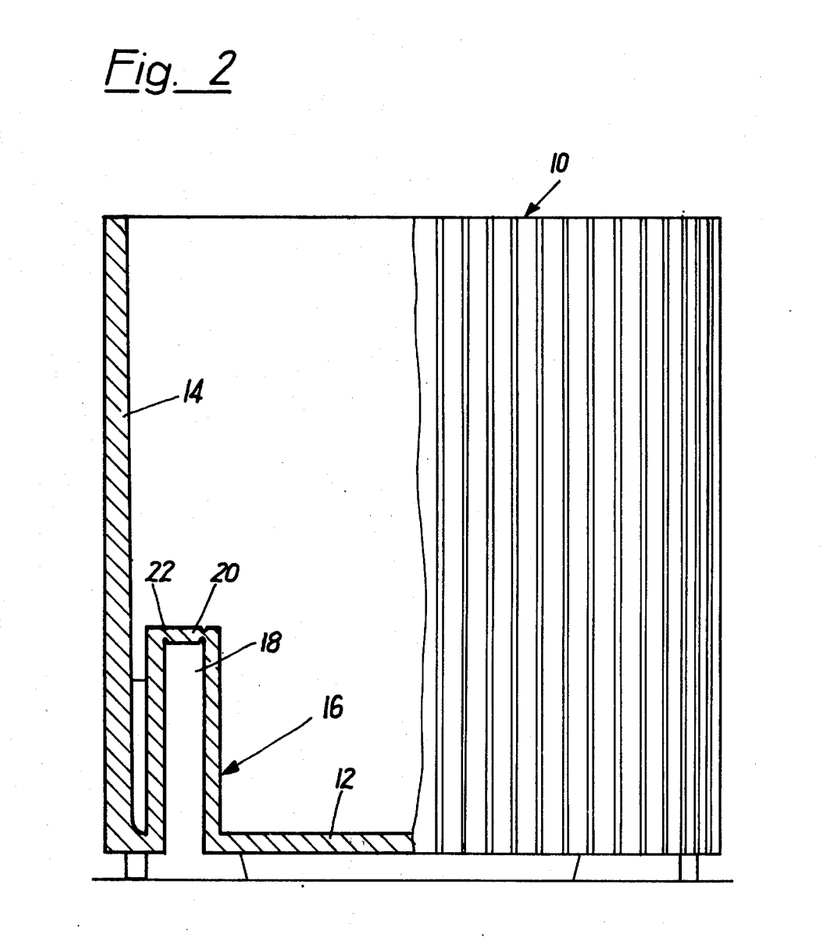
FIG. 2 is a side view, partly in section, through the pot of FIG. 1.
Figure 4:
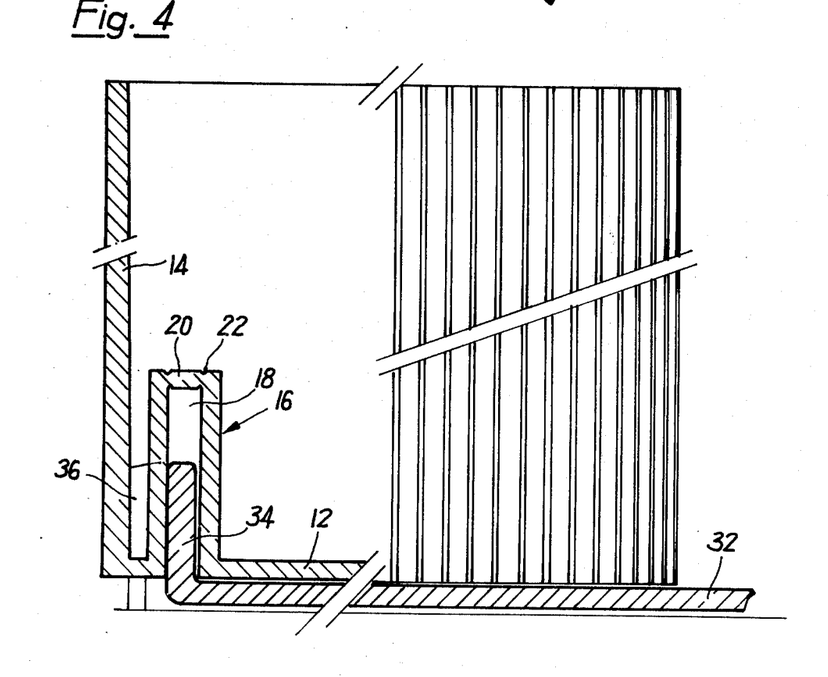
FIG. 4 is a pot in an arrangement according to FIG. 2, borne on supporting brackets.

FIG. 1 shows a pot 10 whose floor is designated 12, its side wall being marked 14. The outer configuration of pot 10 does not have to be rectangular as in the example, but it may also have a square or round horizontal cross section. Any suitable decorative surface may be selected for the exterior of side wall 14. FIGS. 2 and 4 show a striped surface. However, wood grain could be selected as decoration. Pot 10 is preferably plastic, produced for example by injection molding.

Figure 3:
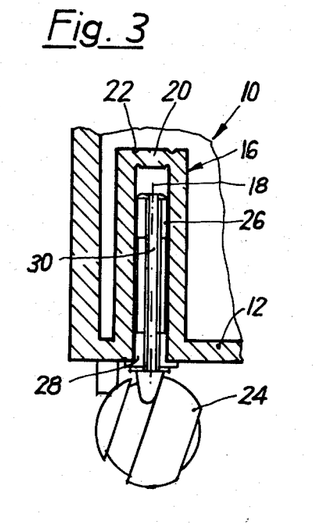
FIG. 3 is a partial section, according to the section representation of FIG. 2, supplemented by a caster mounted on the underside of the pot.

The projections described below, on floor 12 of the pot, are characteristic of this new receptacle. First, we consider the four projections 16 at the corners. As FIGS. 2 to 5 show, these are tubular projections that present a blind bore 18, i.e., they are open to the underside of floor 12 but closed above by an end wall 20. For special situations, there can be a weakening 22 for breaking out upper end wall 20, but in the usual case the relatively low projections 16 will be left closed above as indicated in FIGS. 2 to 4.

The cast tubular projections 16 serve for disposition of external and internal supporting or retaining members. FIG. 3, for example, shows how by means of hollow projections 16, casters 24 can be mounted beneath the pot. For this purpose, for example, there may be bearing sleeves 26, 28 set in blind bore 18, in which then a rod 30 is rotatably borne, supporting the bearing for caster 24 at its lower end.

In the embodiment according to FIG. 4, there is a supporting bracket 32 whose forward bent down end 34 is inserted in blind bore 18 of projection 16. In this way, the receptacle can be fixed, for example, to a wall or to a balcony railing. Of course, other kinds of supports or feet can be arranged below the pot, by means of hollow projections 16. Here, the main load will be accepted by the pot floor, not by the wall of projection 16. Nevertheless, it is recommended, to increase the rigidity of projection 16, that a crosspiece 36 or other connection with side wall 14 be provided.

Figure 5:
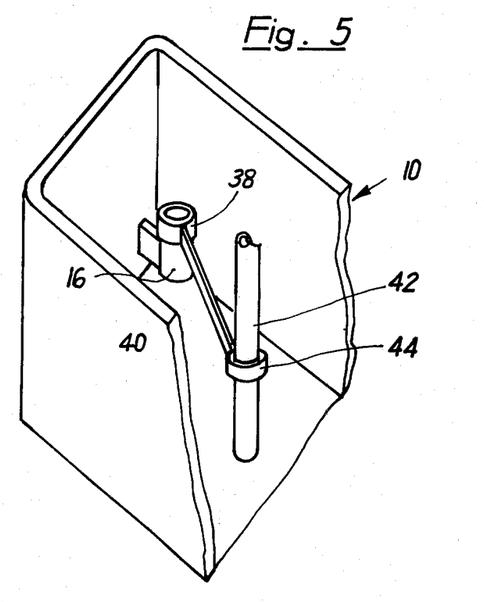
FIG. 5 is a partial perspective view at a slant from above, into a pot according to the invention, wherein a supporting device for plants is mounted.

Holding arrangements can also be fixed to projection 16 inside the receptacle, as shown, for example, in FIG. 5. Such a holder can consist for example of a clamping shell or ring 38 to be fixed on projection 16, a supporting arm 40 connected with said shell or ring, and a small tube 42 connected therewith via a ring 4. In this small tube, a rod or branch can be inserted for example, to hold a plant upright or support a branch of the plant.

Figure 6:
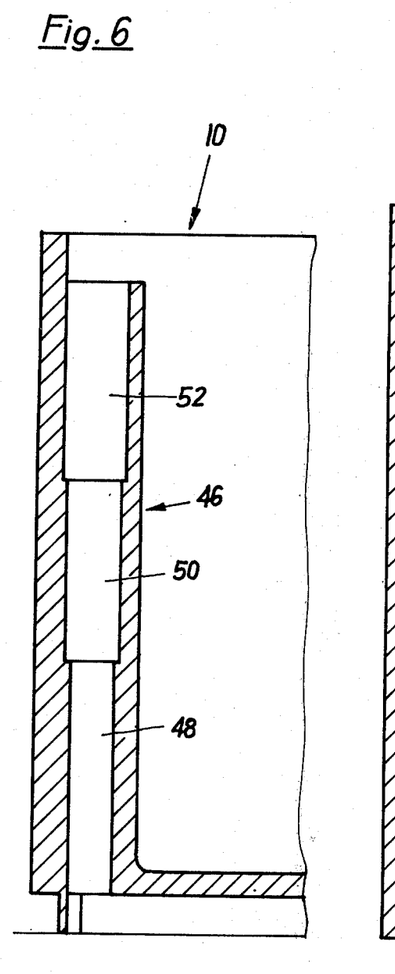
FIG. 6 is a partial section along VI—VI of FIG. 1.

FIG. 6 shows in vertical section a projection 46 that is a different kind, as compared with projections 16. Projection 46 constitutes a tubular shaft that is open at top and bottom, through which, for example, an electric cord or other device can be led into the pot from below. The shaft should be at least high enough so that its upper edge in any case will be above the water level in the pot. If the shaft is not used, it may be closed by a cover (not illustrated).

In the example illustrated in FIG. 6, the bore in tubular shaft 46 is offset stepwise, whereby there are three different bore sections 48, 50, 52 with respectively somewhat larger diameters, from below upward. This configuration of the shaft allows rods or tubes of different thickness to be inserted from above, to find a secure hold on the steplike shoulders 48, 50, 52 of the bore.

Instead of the steplike offset bore 48, 50, 52, tubular shaft 46 may also have a cylindrical bore that is uniform throughout, or a conical bore that tapers toward the top or downward. Electrical or retaining devices can be clamped fast in the conical bores. Obviously, there is the possibility that the receptacle may have more than just one tubular shaft 46.

In addition to the mentioned functions, tubular shafts 46 may also serve to interconnect pots with the same horizontal cross section that are placed one above the other. In this case, a rod or tube can be inserted through the aligned bores of tubular shafts 46 of the superimposed pots.

Figure 7:
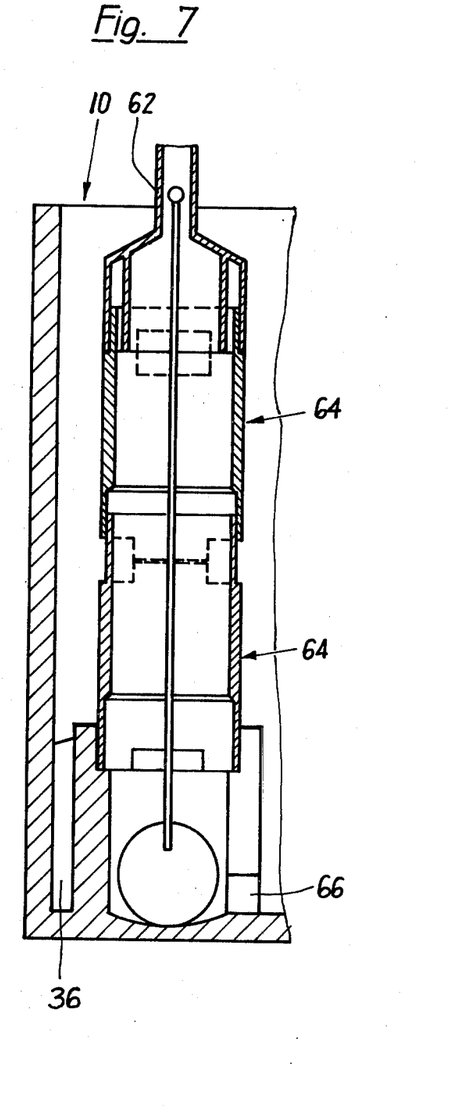
FIG. 7 is a vertical cross section through another projection on the pot floor.
Figure 8:
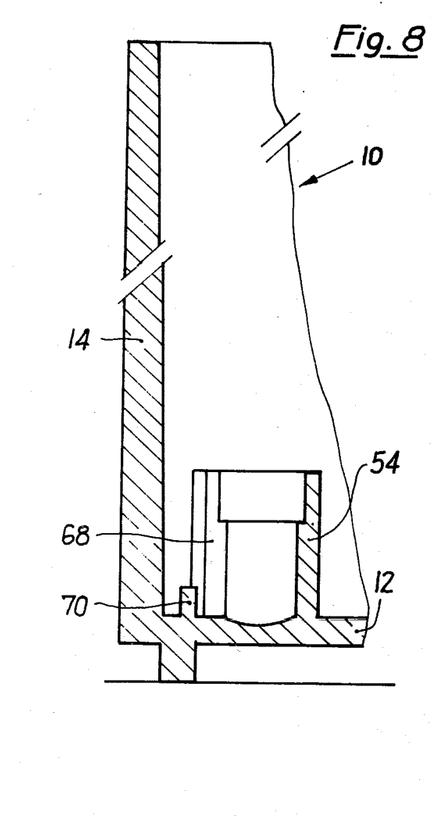
FIG. 8 is a vertical section along VIII—VIII through a projection that is a modification with reference to FIG. 7.
Figure 9:
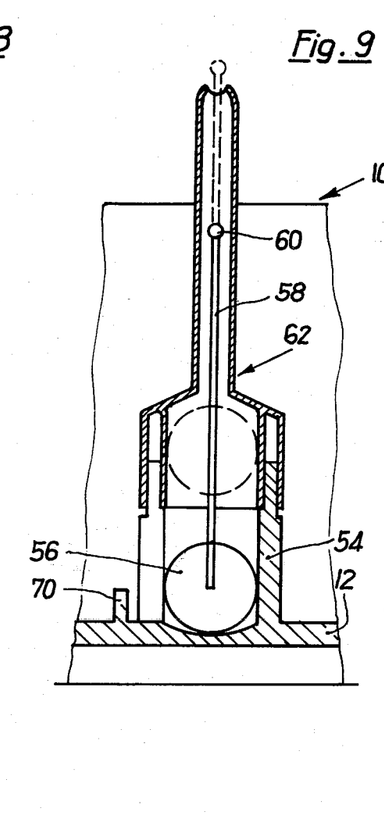
FIG. 9 is again a further embodiment of a socket with a water level indicator slipped on it.

Another special projection on the floor of the pot is designated 54 in FIG. 1, and it is illustrated in various embodiments in FIGS. 7 to 9. The said projection 54 forms a substantially annular socket onto which a tube of a water level indicator may be slipped. The water level indicator consists in the example of a spherical float 56, a rod 58 that extends upward from it, and a colored (e.g. red) ball 60 on the upper end of the rod, which is visible through a transparent tubular attachment, e.g. glass or transparent plastic, and indicates thereby the water level in the pot. In the case of a low pot, transparent attachment 62 may be set directly on socket 54 as shown in FIG. 9. For higher pots, as in FIG. 7, extension tubes 64 may be used. So far as possible, socket 54 should be stepped in by about the wall thickness of tube 64 or of transparent attachment 62 that is to be slipped on, so that on the inside there will be as smooth a transition as possible between socket 54 and tube 64 or attachment 62, not to hamper the movement of float 56.

In the embodiment of FIG. 7, socket 54 can have a hole 66 directly above floor 12. Instead of hole 66, there may also be a vertical slit 68 going continuously from top to bottom in socket 54. With both hole 66 and slit 68, the water level in socket 54 and in tube 64 always corresponds very exactly to the water level in pot 10.

Advantageously, another small projection 70 is provided before the entrance of slit 68, in floor 12 of the pot, which prevents stones or dirt lying on floor 12 from penetrating through the slit into the inner cavity of socket 54. Such a projection 70, acting as a barrier, can also be provided, of course, before hole 66 according to FIG. 7.

Figure 10:
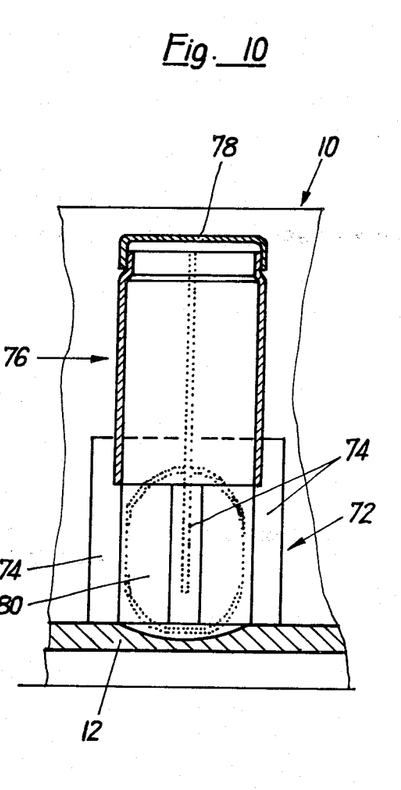
FIG. 10 is a vertical section along X—X of FIG. 1, through another socket-like projection on the pot floor and a watering or water suction tube set thereon.

A socket similar to socket 54 of FIG. 1 is shown in vertical section in FIG. 10 at 72. This socket 72 has not just one but rather four vertical slits 74 for better water passage, and serves for the setting on of a tube 76 through which water can be poured into pot 10, or sucked out of it. Tube 76 may be composed, as in FIG. 7, of tube sections of different length depending upon the height of the pot, or of a plurality of tube sections, and closed at the top with a cover 78. If so required, an ion exchange medium 80, indicated with dotted lines, can be put into tube 76 and socket 72.

Just as in the case of projections 16, socket 54 and 72 can be connected by crosspieces 36 with the side wall of the pot and thereby made more rigid.

Figure 11:
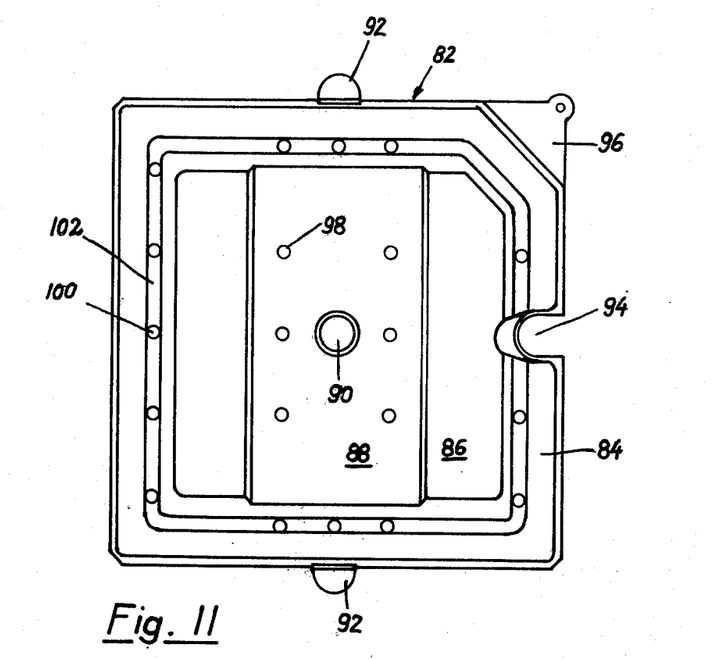
FIGS. 11 and 12 are top and side views, respectively, of an inner inset piece for a small pot.
Figure 12:
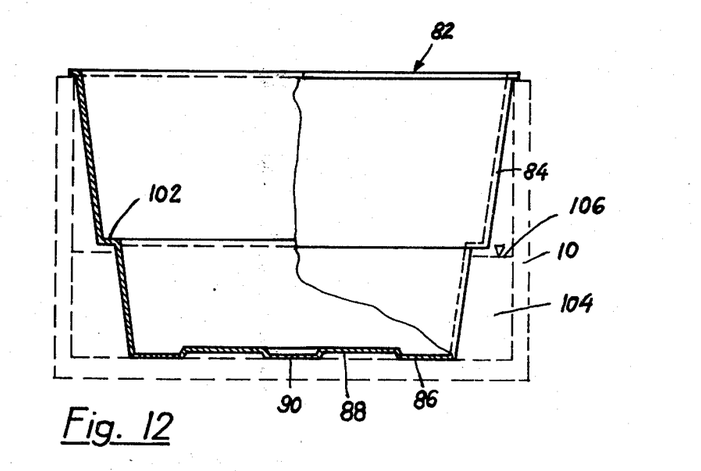

FIGS. 11 and 12 show in top and side view respectively a bowl-shaped inner inset piece or liner 82 for a relatively small pot with square cross section. Inner inset piece 82 extends in this case up to the upper edge of pot 10. Since inset piece 82 tapers toward the bottom as shown in FIG. 12, there is a free space between the inner wall of the pot and the wall of the inset piece, in which space the various low projections 16 and sockets may be accomodated. The space may also serve as a water reservoir.

Inset piece 82 has four inclined steplike offset side walls 84 and a floor 86 with a rather large middle raised portion 88 and therein in turn a small central depression 90 that serves as a support. Tabs 92 on the upper edge facilitate the setting in of inset piece 82 in the pot, or its removal therefrom. A recess 94 is located right at the place where socket 54 is disposed in the pot for a water level indicator. In the finished assembled state, transparent tube 62 of the water level indicator extends out above the top of recess 94 of inset piece 82.

In small receptacles, e.g. those for a table, a special tube 76 for watering or for sucking off water is unnecessary and would even be a bother. Instead, a corner 96 of inset piece 82 is made in such a way that it can be folded up, so that water may be poured into the space between inset piece 82 and the inside wall of pot 10.

Inset piece 82 shown in FIG. 11 has a plurality of relatively small holes 98 in raised portion 88 of floor 86, and in addition, a plurality of relatively small holes 100 in steplike shoulder 102 of side wall 84. This inset piece 82 is used only in hydroponics, whereby nutrient liquid can flow from outside inset piece 82 through holes 98 and 100 into the inner cavity of inset piece 82. In use for earth cultivation, an inner inset piece is used that has holes 100 and also, it otherwise corresponds to inset piece 82 of FIG. 11, except that it has no small holes 98 in the floor. Holes 100, in earth cultivation, serve for root aeration. In addition, one or more wicks or felt strips, advantageously of synthetic material, can be thrust through one or more holes 100, to suck water by capillary action from the space between inner inset piece 82 and the inside wall of pot 10, and to release it to the earth in inset piece 82. The water level in pot 10 must then be so adjusted by means of the above described water level indicator that it is below step 102 of side wall 84. The dispensing of the water supply from the reservoir in pot 10 outside inner inset piece 82 to the earth contained in said inset piece occurs by selection of the cross section of the wick or felt strip, or also by an arrangement whereby the wick or strip is more or less strongly compressed in hole 100 by a clamping screw. The tighter the screw is compressed, the less the water supply through a given wick.

In FIG. 12, pot 10 which receives inset piece 82, is indicated by dashed lines. The free space between inset piece 82 and the inner wall of pot 10 is there indicated by numeral 104. In earth cultivation, there is a water reservoir in space 104 whose surface is indicated at 106. Since in this case holes 98 in floor 86, 88 of inset piece 82 are lacking, the water goes from space 104 only via wicks or felt strips through holes 100, into the earth.

Figure 13:
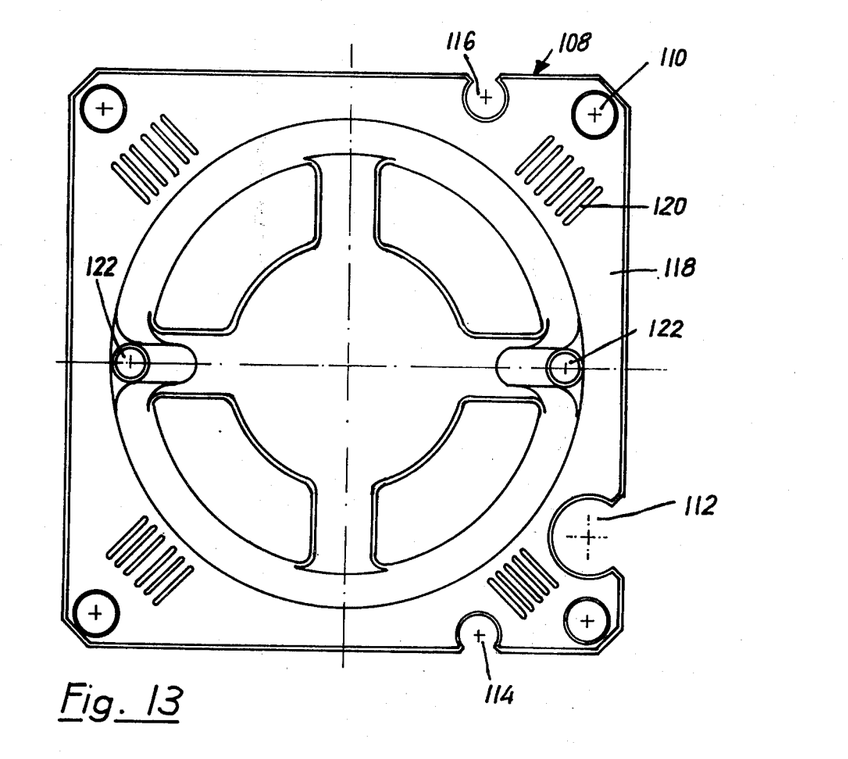
FIGS. 13 and 14 are top and side views, respectively, of an inset piece for a large pot.
Figure 14:
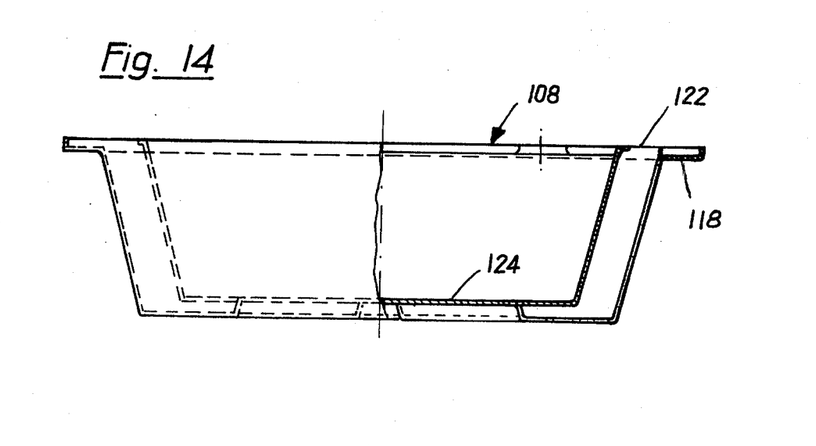

FIGS. 13 and 14 show an inset piece 108 for relatively large pots, e.g., floor tubs. This inset piece in contrast to inset piece 82 of FIGS. 11 and 12 does not reach the upper edge of the pot, but only extends to a mid-height that corresponds about the level of step 102 of inset piece 82. This inset piece 108 is used only in soil cultivation, not in hydroponics. At the corners, where the tubular projections 16 of the pot are located, there are holes 110, even when the tubular projections 16 are lower than inset piece 108. In this case, as in FIG. 5, tubes can be carried through holes 100 and slipped onto projections 16, to make it possible then to fix to these tubes supports or holders corresponding to holder 38, 40, 42, 44.

Inset piece 108 also has a recess or hole 112 at the place where socket 72 for a watering tube 76 is located in pot 10. Tube 76, when assembled, extends through recess 112 up to the vicinity of the upper edge of the pot.

Another recess or hole 114 is provided in inset piece 108 at the place where socket 54 for a water level indicator is located in pot 10. The water level indicator tube then extends, when assembled, through recess 114 out beyond the upper edge of pot 10.

There is another recess or hole 116 in inset piece 108 at the place at which a tubular shaft 46 is provided in pot 10.

In the embodiment according to FIG. 13, a plurality of groups of slits 120 is provided in the upper edge flange 118 of inset piece 108, serving to aerate the roots, and corresponding to holes 100 in inset piece 82 of FIG. 11. Wicks and felt strips may be taken through holes 122, to suck water from the reservoir in the pot, outside inset piece 108, into the earth that it contains. The water level in the pot here must remain below edge flange 118. Wicks or felt strips may again be clamped by clamping screws, in holes 122.

Floor 124 of inset piece 108 may have suitable elevations or depressions to improve its rigidity, but because inset piece 108 is intended for earth cultivation, it has no holes that would correspond to holes 98 in FIG. 11.

The different relative positions of holes or recesses 110 to 116 in comparison to the relative positions of projections 16, 46, 54 and 72 of FIG. 1 were chosen in the various examples of embodiment to show that the relative position of these projections is not governing. There is considerable latitude in distribution of the various projections and consequently also in peripheral distribution of the holes or recesses that are to be aligned in the inset pieces that are respectively adapted to the pots in question.

If the pot is to be in use out of doors, e.g. set out in a garden, a water overflow can be provided. This may be, for example, a projection 16 opened at weakened point 22, or it may be a special tubular projection (not illustrated) which is open from the very beginning and presents a weakened place on the underside of the pot floor which would be opened if need be.

What is claimed is:

1. A receptacle for growing plants comprising a pot having a floor and side walls, at least one bowl-shaped inset piece disposed therein, a plurality of projections on said floor and extending thereabove, said projections each having a blind bore open to the underside of the floor of the pot, and at least one tubular projection member on said floor of said pot and extending to the vicinity of the upper edge of the walls of said pot, said tubular projection member being hollow and open at its top and to the underside of the floor of the pot.

2. A receptacle for growing plants comprising a pot having a floor and side walls, at least one bowl-shaped inset piece disposed therein, a plurality of projections on said floor and extending thereabove, said projections each having a blind bore open to the underside of the floor of the pot, a further projection on said floor and extending thereabove, said further projection comprising a substantially annular socket, open at the top and having at least one lateral opening extending to the floor of said pot, said socket being adapted to support an upstanding tubular member with the bore thereof in fluid communication with a fluid in the body of said pot through said lateral opening in said annular socket, each of said projections and further projections being positioned adjacent a wall of said pot.

3. A receptacle for growing plants comprising a pot having a floor and side walls, at least one bowl-shaped inset piece disposed therein, a plurality of projections on said floor and extending thereabove, said projections each having a blind bore open to the underside of the floor of the pot, a further projection on said floor and extending thereabove, said further projection comprising a substantially annular socket, open at the top and having at least one lateral opening extending to the floor of said pot, said socket being adapted to support an upstanding tubular member with the bore thereof in fluid communication with a fluid in the body of said pot through said lateral opening in said annular socket, said inset piece including an opening above each of said projections and further projection.

4. A receptacle according to claim 3 wherein said opening comprises a recess extending upwardly to the vicinity of the upper edge of said receptacle.

5. A receptacle according to claim 4 wherein said inset piece is provided with a plurality of openings at approximately mid-height of said receptacle.

6. A receptacle according to claim 5 wherein said openings are provided in a step-like shoulder of a wall of said inset piece.

7. A receptacle according to claim 5 further comprising wick means extending through at least one of said openings for drawing water from said pot into said inset means by capillary action.

8. A receptacle according to claim 7 further comprising means for clamping said wick means in said opening.

9. A receptacle according to claim 5 in which the floor of said inset piece is provided with a plurality of further openings.

10. A receptacle according to claim 9 wherein said further openings are provided in a raised portion of the floor of said inset piece.

11. A receptacle for growing plants comprising a pot having a floor and side walls, at least one bowl-shaped inset piece disposed therein, a plurality of projections on said floor and extending thereabove, said projections each having a blind bore open to the underside of the floor of the pot, said inset piece extending upwardly to the vicinity of the upper edge of the receptacle, the upper portion of said inset piece comprising a flange portion covering a portion of said pot, said flange portion forming a flap that can be raised up to permit access to said pot.

12. A receptacle for growing plants in earth comprising: an outer pot having a floor and side walls; a tube member upstanding from the floor of said pot, open at the top and having at least one lateral opening adjacent the floor of said outer pot; water level indicator means comprising a float guided for vertical movement in said upstanding tube member; a removeable inner pot fitting in the outer pot and provided with an opening through which said upstanding tube member extends, said inner pot being adapted to receive earth for growing plants and forming a water reservoir space between the inner pot and the outer pot; means defining an aperture for introducing water into said water reservoir space; and wick means extending from said water reservoir space into said inner pot for slowly transporting water from said reservoir to earth in said inner pot.

13. A receptacle according to claim 12 wherein said wick means comprise the sole means of fluid communication between said water reservoir and earth in said inner pot.

14. A receptacle according to claim 12 further comprising means for preventing clogging of said lateral opening in said upstanding tube member.

15. A receptacle according to claim 14 wherein said clogging preventing means comprises a barrier projection on said floor and extending thereabove adjacent said socket a slight distance from said lateral opening.

16. A receptacle according to claim 12 wherein said upstanding tube member comprises an annular socket upstanding from the floor of said pot, open at the top and an upstanding annular tube supported on said socket and having its bore in fluid communication with said water reservoir space through said lateral opening.

17. A receptacle according to claim 12 further comprising means for permitting overflow of liquid if the level of liquid in said water reservoir exceeds a desired level.

18. A receptacle according to claim 17 wherein said liquid overflow permitting means comprises a tubular member extending upwardly from the floor of said outer pot, said tubular member being open to the underside of said floor and being open to the body of said water reservoir at a desired level above said floor.

19. A receptacle according to claim 12 wherein the side wall of said inner pot is provided with a plurality of openings.

20. A receptacle according to claim 19 wherein said openings are provided in a step-like shoulder of a wall of said inner pot.

21. A receptacle according to claim 20 wherein said wick means extend through at least one of said openings for drawing water from said pot into said inner pot by capillary action.

22. A receptacle according to claim 21 further comprising means for clamping said wick means in said opening.

* * * * *